(12) United States Patent
Kucherov et al.

(10) Patent No.: US 11,301,138 B2
(45) Date of Patent: Apr. 12, 2022

(54) DYNAMIC BALANCING OF INPUT/OUTPUT (IO) OPERATIONS FOR A STORAGE SYSTEM

(71) Applicant: EMC IP Holding Company LLC, Hopkinton, MA (US)

(72) Inventors: Anton Kucherov, Dudley, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 141 days.

(21) Appl. No.: 16/516,670

(22) Filed: Jul. 19, 2019

(65) Prior Publication Data

US 2021/0019057 A1 Jan. 21, 2021

(51) Int. Cl.
*G06F 3/06* (2006.01)

(52) U.S. Cl.
CPC .......... *G06F 3/0611* (2013.01); *G06F 3/0653* (2013.01); *G06F 3/0659* (2013.01); *G06F 3/0673* (2013.01)

(58) Field of Classification Search
CPC .... G06F 3/0611; G06F 3/0653; G06F 3/0659; G06F 3/0673
See application file for complete search history.

(56) References Cited

U.S. PATENT DOCUMENTS

| | | | |
|---|---|---|---|
| 6,496,908 B1 | 12/2002 | Kamvysselis et al. | |
| 6,553,464 B1 | 4/2003 | Kamvysselis et al. | |
| 6,640,280 B1 | 10/2003 | Kamvysselis et al. | |
| 6,862,632 B1 | 3/2005 | Halstead et al. | |
| 6,883,018 B1 | 4/2005 | Meiri et al. | |
| 6,886,164 B2 | 4/2005 | Meiri | |
| 6,898,685 B2 | 5/2005 | Meiri et al. | |
| 6,910,075 B2 | 6/2005 | Marshak et al. | |
| 6,938,122 B2 | 8/2005 | Meiri et al. | |
| 6,944,726 B2 | 9/2005 | Yoder et al. | |
| 6,968,369 B2 | 11/2005 | Veprinsky et al. | |
| 6,976,139 B2 | 12/2005 | Halstead et al. | |
| 7,000,086 B2 | 2/2006 | Meiri et al. | |

(Continued)

OTHER PUBLICATIONS

U.S. Appl. No. 15/001,789, filed Jan. 20, 2016, Meiri et al.
(Continued)

*Primary Examiner* — Nanci N Wong
(74) *Attorney, Agent, or Firm* — Daly, Crowley, Mofford & Durkee, LLP

(57) ABSTRACT

In one aspect, performing dynamic balancing of input/output (IO) operations includes providing a first queue for a first storage unit and a second queue for a second storage unit. The queues are configured to receive IO requests directed to the storage units. An aspect also includes determining a quality of service (QoS) value assigned to each of the storage units, pulling entries from the queues at a rate that accords with the QoS value, executing IOs, and monitoring bandwidth of the IO operations. Upon determining the bandwidth is not in alignment with the QoS value for either of the first and second storage units, a further aspect includes modifying the rate in which entries are pulled from at least one of the queues, continuing the monitoring the bandwidth and the modifying the rate until the bandwidth aligns with the QoS value assigned to each of the storage units.

17 Claims, 5 Drawing Sheets

(56) References Cited

U.S. PATENT DOCUMENTS

| | | |
|---|---|---|
| 7,024,525 B2 | 4/2006 | Yoder et al. |
| 7,032,228 B1 | 4/2006 | McGillis et al. |
| 7,051,176 B2 | 5/2006 | Meiri et al. |
| 7,054,883 B2 | 5/2006 | Meiri et al. |
| 7,113,945 B1 | 9/2006 | Moreshet et al. |
| 7,114,033 B2 | 9/2006 | Longinov et al. |
| 7,174,423 B2 | 2/2007 | Meiri et al. |
| 7,197,616 B2 | 3/2007 | Meiri et al. |
| 7,228,456 B2 | 6/2007 | Lecrone et al. |
| 7,240,116 B2 | 7/2007 | Marshak et al. |
| 7,292,969 B1 | 11/2007 | Aharoni et al. |
| 7,376,651 B2 | 5/2008 | Moreshet et al. |
| 7,380,082 B2 | 5/2008 | Meiri et al. |
| 7,383,385 B2 | 6/2008 | Meiri et al. |
| 7,383,408 B2 | 6/2008 | Meiri et al. |
| 7,386,668 B2 | 6/2008 | Longinov et al. |
| 7,392,360 B1 | 6/2008 | Aharoni et al. |
| 7,409,470 B2 | 8/2008 | Halstead et al. |
| 7,430,589 B2 | 9/2008 | Veprinsky et al. |
| 7,577,957 B1 | 8/2009 | Kamvysselis et al. |
| 7,613,890 B1 | 11/2009 | Meiri |
| 7,617,372 B1 | 11/2009 | Bjornsson et al. |
| 7,668,177 B1 * | 2/2010 | Trapp .................. H04L 47/50 370/395.42 |
| 7,702,871 B1 | 4/2010 | Arnon et al. |
| 7,870,195 B1 | 1/2011 | Meiri |
| 8,046,545 B2 | 10/2011 | Meiri et al. |
| 8,078,813 B2 | 12/2011 | LeCrone et al. |
| 8,332,687 B1 | 12/2012 | Natanzon et al. |
| 8,335,771 B1 | 12/2012 | Natanzon et al. |
| 8,335,899 B1 | 12/2012 | Meiri et al. |
| 8,468,180 B1 | 6/2013 | Meiri et al. |
| 8,578,204 B1 | 11/2013 | Ortenberg et al. |
| 8,600,943 B1 | 12/2013 | Fitzgerald et al. |
| 8,619,800 B1 * | 12/2013 | Finney ................ H04L 49/9042 370/412 |
| 8,677,087 B2 | 3/2014 | Meiri et al. |
| 8,694,700 B1 | 4/2014 | Natanzon et al. |
| 8,706,959 B1 | 4/2014 | Arnon et al. |
| 8,719,497 B1 | 5/2014 | Don et al. |
| 8,732,124 B1 | 5/2014 | Arnon et al. |
| 8,782,357 B2 | 7/2014 | Halstead et al. |
| 8,812,595 B2 | 8/2014 | Meiri et al. |
| 8,825,964 B1 | 9/2014 | Sopka et al. |
| 8,838,849 B1 | 9/2014 | Meiri et al. |
| 8,862,546 B1 | 10/2014 | Natanzon et al. |
| 8,914,596 B2 | 12/2014 | Lecrone et al. |
| 8,966,211 B1 | 2/2015 | Arnon et al. |
| 8,977,826 B1 | 3/2015 | Meiri et al. |
| 9,002,904 B1 | 4/2015 | Meiri et al. |
| 9,009,437 B1 | 4/2015 | Bjornsson et al. |
| 9,026,492 B1 | 5/2015 | Shorey et al. |
| 9,026,696 B1 | 5/2015 | Natanzon et al. |
| 9,037,816 B1 | 5/2015 | Halstead et al. |
| 9,037,822 B1 | 5/2015 | Meiri et al. |
| 9,100,343 B1 | 8/2015 | Riordan et al. |
| 9,110,693 B1 | 8/2015 | Meiri et al. |
| 9,208,162 B1 | 12/2015 | Hallak et al. |
| 9,304,889 B1 | 4/2016 | Chen et al. |
| 9,323,750 B2 | 4/2016 | Natanzon et al. |
| 9,342,465 B1 | 5/2016 | Meiri |
| 9,378,106 B1 | 6/2016 | Ben-Moshe et al. |
| 9,396,243 B1 | 7/2016 | Halevi et al. |
| 9,418,131 B1 | 8/2016 | Halevi et al. |
| 9,483,355 B1 | 11/2016 | Meiri et al. |
| 9,524,220 B1 | 12/2016 | Veprinsky et al. |
| 9,558,083 B2 | 1/2017 | LeCrone et al. |
| 9,606,739 B1 | 3/2017 | LeCrone et al. |
| 9,606,870 B1 | 3/2017 | Meiri et al. |
| 9,626,309 B1 * | 4/2017 | Burke .................. G06F 13/364 |
| 9,753,663 B1 | 9/2017 | LeCrone et al. |
| 9,959,063 B1 | 5/2018 | Meiri et al. |
| 9,959,073 B1 | 5/2018 | Meiri |
| 10,007,466 B1 | 6/2018 | Meiri et al. |
| 10,025,843 B1 | 7/2018 | Meiri et al. |
| 10,055,161 B1 | 8/2018 | Meiri et al. |
| 10,095,428 B1 | 10/2018 | Meiri et al. |
| 10,152,527 B1 | 12/2018 | Meiri et al. |
| 10,238,487 B2 | 3/2019 | Alon et al. |
| 10,261,853 B1 | 4/2019 | Chen et al. |
| 2004/0181794 A1 * | 9/2004 | Coleman ................ G06F 11/008 718/104 |
| 2015/0095570 A1 * | 4/2015 | Lee .................... G06F 11/2087 711/114 |

OTHER PUBLICATIONS

U.S. Appl. No. 15/085,188, filed Mar. 30, 2016, Meiri et al.
U.S. Appl. No. 15/499,226, filed Apr. 27, 2017, Meiri et al.
U.S. Appl. No. 15/499,199, filed Apr. 27, 2017, Stronge et al.
U.S. Appl. No. 15/797,329, filed Oct. 30, 2017, Parasnis et al.
U.S. Appl. No. 15/971,153, filed May 4, 2018, Meiri et al.
U.S. Appl. No. 15/971,310, filed May 4, 2018, Kucherov et al.
U.S. Appl. No. 15/971,325, filed May 4, 2018, Kucherov et al.
U.S. Appl. No. 15/971,445, filed May 4, 2018, Kucherov et al.
U.S. Appl. No. 16/050,247, filed Jul. 31, 2018, Schneider et al.
U.S. Appl. No. 16/177,782, filed Nov. 1, 2018, Hu et al.
U.S. Appl. No. 16/264,825, filed Feb. 1, 2019, Chen et al.
U.S. Appl. No. 16/263,414, filed Jan. 31, 2019, Meiri et al.
U.S. Appl. No. 16/395,595, filed Apr. 26, 2019, Meiri et al.
U.S. Appl. No. 16/396,880, filed Apr. 29, 2019, Meiri et al.
U.S. Appl. No. 16/398,595, filed Apr. 30, 2019, Kucherov et al.

\* cited by examiner

DYNAMIC BALANCING OF INPUT/OUTPUT (IO) OPERATIONS FOR A STORAGE SYSTEM

BACKGROUND

One goal of using Quality of Service (QoS) policies in a storage system is to balance the input/output (IO) rate or latency between different storage units in the system. However, despite the use of QoS policies it is oftentimes the case that the actual bandwidth or latency detected in the system is out of balance with the desired QoS bandwidth or latency. This can be due to factors, such as changes in resources needed for each type of IO and/or unanticipated changes occurring in the network.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method to perform dynamic balancing of input/output (IO) operations for storage units. The method includes providing a first queue for a first storage unit of the storage units and providing a second queue for a second storage unit of the storage units. The first queue and the second queue are configured to receive input/output (IO) requests directed to corresponding first and second storage units. The method also includes determining a quality of service (QoS) value assigned to each of the first storage unit and the second storage unit, pulling entries from each of the first queue and the second queue at a rate that accords with the QoS value assigned to each of the first storage unit and the second storage unit, executing IO operations pursuant to the pulled entries, and monitoring bandwidth of the IO operations, responsive to the executing, with respect to the first storage unit and the second storage unit. Upon determining, from the monitoring, the bandwidth is not in alignment with the QoS value for either of the first storage unit and the second storage unit, the method further includes modifying the rate in which entries are pulled from at least one of the first queue and the second queue, continuing the monitoring the bandwidth and the modifying the rate until the bandwidth aligns with the QoS value assigned to each of the first storage unit and the second storage unit.

Another aspect may provide a system to perform dynamic balancing of input/output (IO) operations for storage units. The system includes a memory having computer-executable instructions. The system also includes a processor operated by a storage system. The processor executes the computer-executable instructions. When executed by the processor, the computer-executable instructions cause the processor to perform operations. The operations include providing a first queue for a first storage unit of the storage units and providing a second queue for a second storage unit of the storage units. The first queue and the second queue are configured to receive input/output (IO) requests directed to corresponding first and second storage units. The operations also include determining a quality of service (QoS) value assigned to each of the first storage unit and the second storage unit, pulling entries from each of the first queue and the second queue at a rate that accords with the QoS value assigned to each of the first storage unit and the second storage unit, executing IO operations pursuant to the pulled entries, and monitoring bandwidth of the IO operations, responsive to the executing, with respect to the first storage unit and the second storage unit. Upon determining, from the monitoring, the bandwidth is not in alignment with the QoS value for either of the first storage unit and the second storage unit, the operations further include modifying the rate in which entries are pulled from at least one of the first queue and the second queue, continuing the monitoring the bandwidth and the modifying the rate until the bandwidth aligns with the QoS value assigned to each of the first storage unit and the second storage unit.

Another aspect may provide a computer program product to perform dynamic balancing of input/output (IO) operations for storage units. The computer program product is embodied on a non-transitory computer readable medium. The computer program product includes instructions that, when executed by a computer at a storage system, causes the computer to perform operations. The operations include providing a first queue for a first storage unit of the storage units and providing a second queue for a second storage unit of the storage units. The first queue and the second queue are configured to receive input/output (IO) requests directed to corresponding first and second storage units. The operations also include determining a quality of service (QoS) value assigned to each of the first storage unit and the second storage unit, pulling entries from each of the first queue and the second queue at a rate that accords with the QoS value assigned to each of the first storage unit and the second storage unit, executing IO operations pursuant to the pulled entries, and monitoring bandwidth of the IO operations, responsive to the executing, with respect to the first storage unit and the second storage unit. Upon determining, from the monitoring, the bandwidth is not in alignment with the QoS value for either of the first storage unit and the second storage unit, the operations further include modifying the rate in which entries are pulled from at least one of the first queue and the second queue, continuing the monitoring the bandwidth and the modifying the rate until the bandwidth aligns with the QoS value assigned to each of the first storage unit and the second storage unit.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
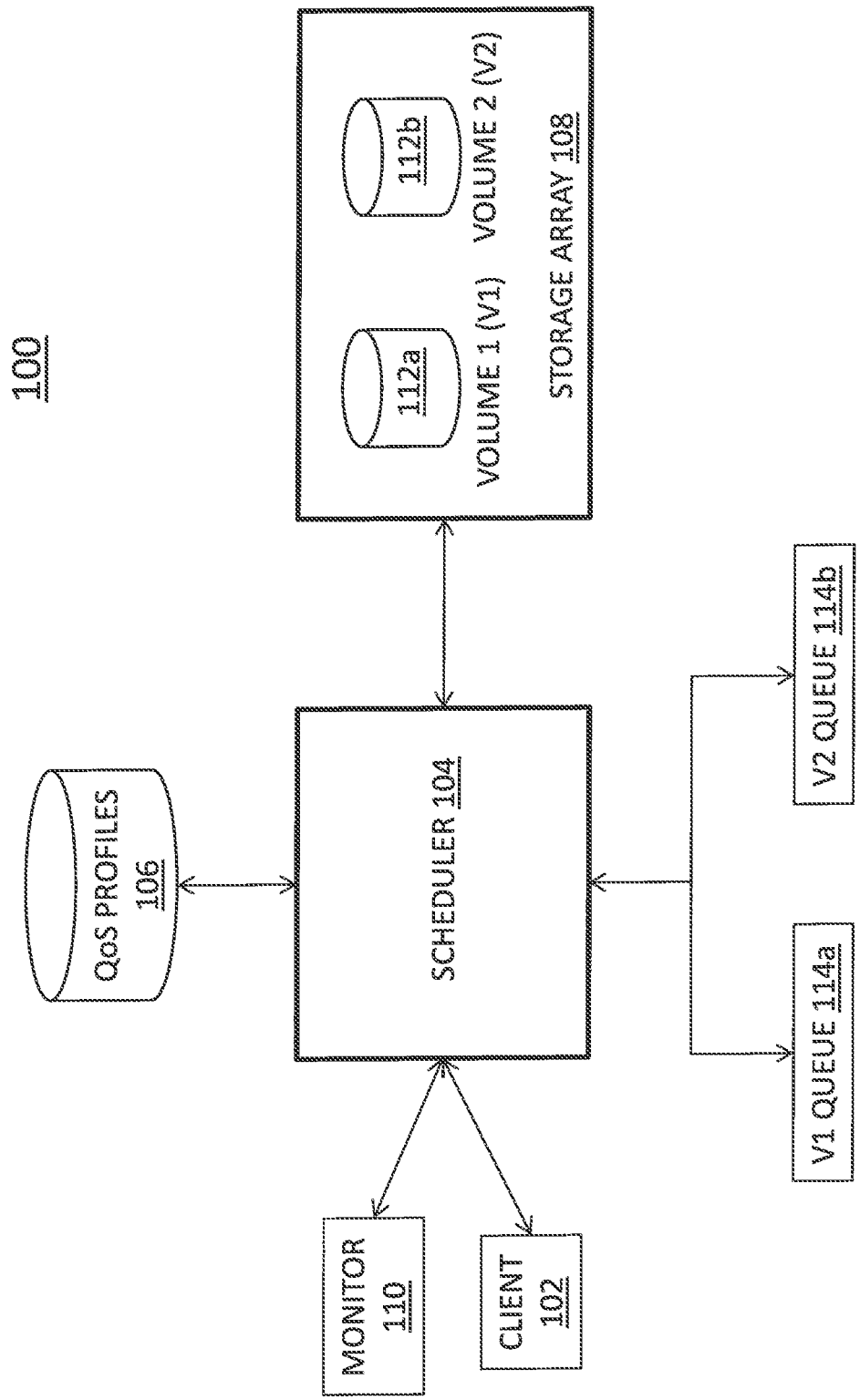
FIG. 1 is a block diagram illustrating one example of a system configured to perform dynamic balancing of input/output (IO) operations for storage units in accordance with an embodiment.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data, as well as issue requests for configuration of storage units in the storage system. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium. Also, a storage unit may refer to any unit of storage including those described above with respect to the storage devices, as well as including storage volumes, logical drives, containers, or any unit of storage exposed to a client or application. A storage volume may be a logical unit of storage that is independently identifiable and addressable by a storage system.

In certain embodiments, the term "IO request" or simply "IO" may be used to refer to an input or output request, such as a data read or data write request or a request to configure and/or update a storage unit feature. A feature may refer to any service configurable for the storage system.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network. (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data. An exemplary content addressable storage (CAS) array is described in commonly assigned U.S. Pat. No. 9,208,162 (hereinafter "'162 patent"), which is hereby incorporated by reference).

In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a storage unit may refer to any unit of storage, physical or logical. In an embodiment, a storage unit may include a volume or a set of volumes. A volume can span multiple disks in a storage array to ease recovery during a failover. A volume may be a removable hard disk.

Quality of Service (QoS) in certain embodiments may refer to a minimum set of performance elements for which a storage device or unit is maintained. QoS performance aspects may relate to minimum/maximum bandwidth requirements, maximum latency allowed, etc.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

As indicated above, one goal of QoS is to balance the IO rate or latency between different storage elements on the same array based on different policies. For instance, a preferred user may end up consuming fewer resources than a lower priori user due to the lower priority user pushing in a lot more IO. In this instance, the preferred user would experience lower performance and higher latency. There are a couple of ways to enable QoS: limiting the host bandwidth per client (maximum-based QoS), and assigning different levels of service (e.g., Platinum, Gold, Silver, etc.) and trying to prioritize host bandwidth based on the levels of service using different queues in the scheduler for each type.

A challenge with the former approach is that when setting a maximum for user IO, even if there are other tenants/devices, the user would not be able to consume more bandwidth than the maximum limit set. The issue with the latter approach is that while placing the IOs in different queues based on priority, actual resources needed for each IO type are not accounted for. For instance, with a high cache hit ratio, one may consume a miniscule amount of resources for fairly high bandwidth since most reads would be done from RAM and not the actual backend. This will result in the high cache hit IOs being re-queued in less time and thus finishing earlier and faster and not following the policy (i.e., getting higher bandwidth than other workloads).

The embodiments described herein provide a technique to perform dynamic balancing of IO operations for a storage system based on bandwidth without the rigidity of limiting a maximum bandwidth.

Turning now to FIG. 1, a system for perform dynamic balancing of input/output (IO) operations for a storage system 100 will now be described. The storage system 100 includes a client 102, a scheduler 104, a QoS database 106, a storage array 108 and queues 114A and 114B.

The client 102 may be implemented as one or more applications, systems, users, etc. that send requests for IO operations to the storage array and receive responses therefrom.

The scheduler 104 may control execution of read and write commands to the storage units 112A and 112B. The scheduler 104 may be connected to the storage units 112A-112B and may pass data to and/or from the storage units via suitable storage drivers (not shown).

Also included in the system 100 is a monitor 110 that is configured to monitor IO operations and flow through the system and determine the amount of network capacity and bandwidth used. In certain embodiments, the monitor 110 compares this usage information to assigned QoS levels for each of the storage units and renders decisions whether to modify a rate in which IO requests are pulled from respective storage unit queues in order to balance the bandwidth specified in the QoS assignments with the actual, current bandwidth usage.

In one embodiment, the scheduler 104 and/or monitor 110 may be provided as software components, e.g., computer program code that, when executed on a processor, may cause a computer to perform functionality described herein. In a certain embodiment, the storage system 100 includes an operating system (OS) (shown generally in FIG. 5), and the scheduler and/or monitor may be provided as user space processes executable by the OS. In other embodiments, one or more of the scheduler and monitor may be provided, at least in part, as hardware, such as digital signal processor (DSP) or an application specific integrated circuit (ASIC) configured to perform functionality described herein. It is understood that the scheduler and monitor may be implemented as a combination of software components and hardware components.

In an embodiment, the system 100 may maintain a configuration repository (not shown) in a persistent storage (e.g., in one of the storage units in the array 108) that stores configuration information, such as information related to QoS associated with the storage units, etc. The QoS information may be implemented in QoS profiles database 106 as shown, e.g., in FIG. 1.

Storage array 108 includes storage units 112A and 112B. The storage units may be implemented, e.g., as storage volumes, logical drives, containers, or any units of storage that are exposed to a client or application (e.g., client 102). While only two storage units are shown for ease of illustration, it will be understood that any number of storage units may be implemented in the system 100. Storage units 112A-112B can be any type of memory having access times that are faster compared to other storage units (e.g., in some embodiments, a storage unit may be provided as dynamic random-access memory (DRAM), synchronous DRAM (SDRAM), double data rate SDRAM (DDR SDRAM), such as DDR3 SDRAM).

In other embodiments, the system 100 may employ more than a single type of memory technology, including a mix of more than one Flash technology (e.g., single level cell (SLC) flash and multilevel cell (MLC) flash), and a mix of Flash and DRAM technologies.

Queues 114A-114B receive IO requests from clients and hold the requests until they are pulled for execution. The queues are described further in FIGS. 2A-2B and 3A-3B. While only two queues are shown for ease of illustration, it will be understood that any number of queues may be implemented in the system 100 (e.g., one queue for each corresponding storage unit).

Figures 2A, 2B:
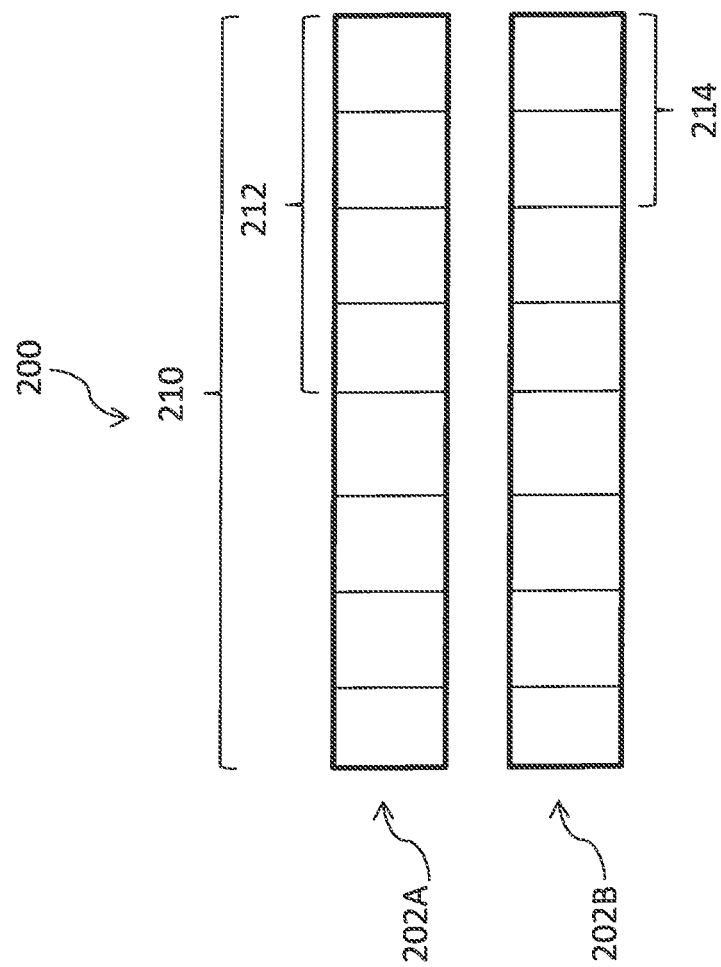
FIG. 2A depicts a set of entry queues for corresponding storage units and FIG. 2B depicts corresponding quality of service (QoS) profiles usable in performing dynamic balancing of IO operations for storage units in accordance with an embodiment.

Turning now to FIGS. 2A-2B and FIGS. 3A-3B, queues and QoS tables for use in providing dynamic balancing of IO operations for the storage system will now be described. In FIGS. 2A-2B, the same QoS has been assigned for each of the storage units in the system, while in FIGS. 3A-3B, a different QoS has been assigned to the respective storage units. In the embodiments described in FIGS. 2A-2B and 3A-3B, the storage units are described as volumes. It will be understood, however, that other types of storage units may be implemented in order to realize the advantages of the embodiments described herein.

In FIGS. 2A-2B, a set of queues 202A and 202B are shown having a plurality of fields 210 for IO entries associated with respective volumes V1 and V2. Queue 202A corresponds to V1 and queue 202B corresponds to V2. Likewise, V1 corresponds to storage unit 112A and V2 corresponds to storage unit 112B of FIG. 1.

One or more policies may be established for each of the volumes with respect to a desired QoS. The policies may be set by a client (e.g., customer 102 of FIG. 1). As indicated above, in the embodiment shown in FIGS. 2A (queues 200) and 2B, a table 204 illustrates a single level of QoS (L1) (in column 206) has been assigned to both volumes V1 and V2 (in column 208) as part of a QoS policy. This means that the rate at which IO requests are pulled from both queues 202A and 202B (rend subsequently executed) are set to be the same for both queues.

Over time, in response to monitoring the performance of the system, if it is determined that the QoS is not being satisfied, then the system modifies the rate at which the IO entries are pulled from the queues 202A and 202B in order to ensure that the actual performance of the system is in balance with the assigned QoS levels assigned to the volumes V1 and V2. Note that as the system modifies the rate at which entries are pulled from either queue, the QoS level originally assigned to each volume does not change during this process.

As indicated above, at the initial stage of operation, both queue 202A and 202B will have its entries pulled at the same rate since the QoS level assigned to both volumes is the same. The system will then monitor the performance of the IO operations executed for the volumes. By way of example, suppose that in response to the monitoring, the system determines that V1 is getting 100 MB/s and V2 is getting 200 MB/s even though their QoS is the same. This means that twice the amount of resources is now needed for the V1 so the system will adaptively start pulling twice as many entries from the queue that is getting lower bandwidth. In this manner the bandwidth will level out at both volumes getting 133 MB/s. If the pattern changes, in response to ongoing monitoring, then the rate will again be adaptively adjusted until the volumes experience equal bandwidth. As shown, e.g., in FIGS. 2A-2B, twice the number of entries 212 is being pulled from queue 202A than is being pulled from queue 202B (i.e., entries 214).

Figures 3A, 3B:
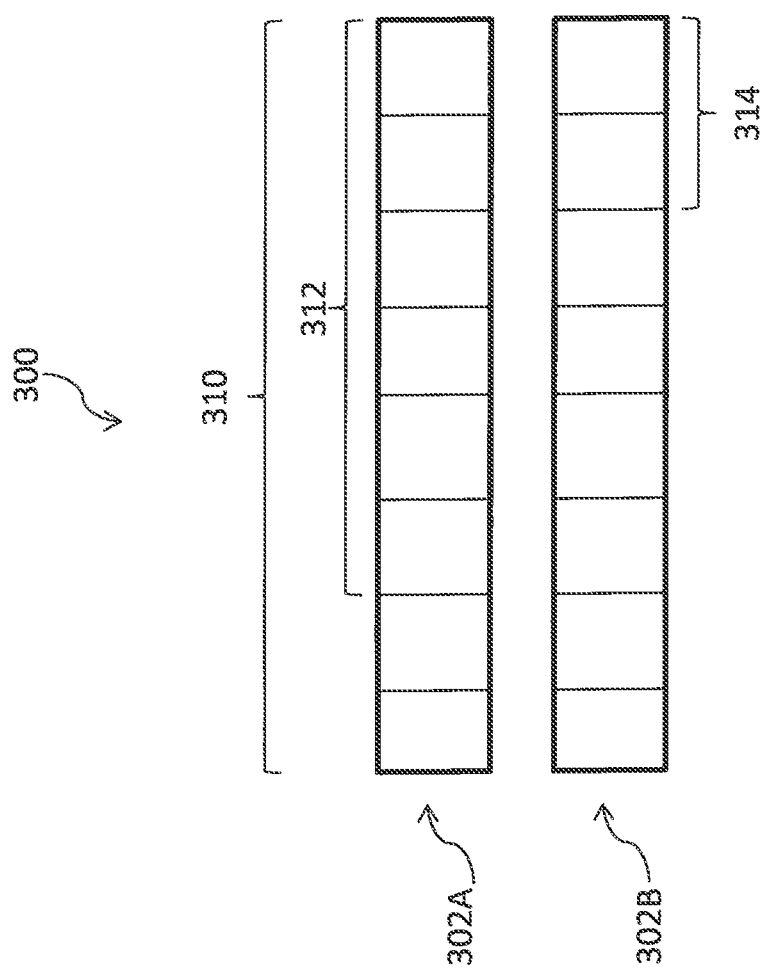
FIG. 3A depicts a set of entry queues for corresponding storage units and FIG. 3B depicts corresponding quality of service (QoS) profiles usable in performing dynamic balancing of IO operations for storage units in accordance with an alternative embodiment.

FIGS. 3A-3B illustrate an embodiment in which the QoS levels differ for both volumes. As shown in table 304, volume 1 V1 is assigned a QoS level 1 L1 and volume 2 V2 is assigned a QoS level 2 L2. By way of example, suppose the L1 QoS (shown in column 306) requires that bandwidth be twice as fast as the bandwidth for L2 QoS (also shown in column 306). In this example, twice as many entries may be initially pulled from queue 302B than are pulled from queue 302A of queues 300.

The system will then monitor the performance of the IO operations executed for the volumes. By way of example, suppose that in response to the monitoring, the system determines that V1 is getting 150 MB/s and V2 is getting 150 MB/s even though entries for queue 302A is being pulled at twice the rate of queue 302B. This means that more resources are needed for the V1 so the system will adaptively start pulling more than twice as many entries from the queue 302A. For example, more entries 312 are pulled from queue 302A than entries 314 for queue 302B.

In response to the monitoring, if the system determines that a full bandwidth (e.g., the bandwidth in accordance with the assigned QoS) has not been reached because the volume has a lower utilization (e.g., it does not have enough outstanding IOs to actually achieve equal bandwidth), in this case, this is noted in the recalculation cycle that an attempt to pull was performed but no items were pulled from the queue. In this instance, the ratio will not be adjusted for this cycle.

It will be understood that the monitoring and rate modification may be performed in a loop fashion until the desired bandwidth is realized for the IO operations.

Figure 4:
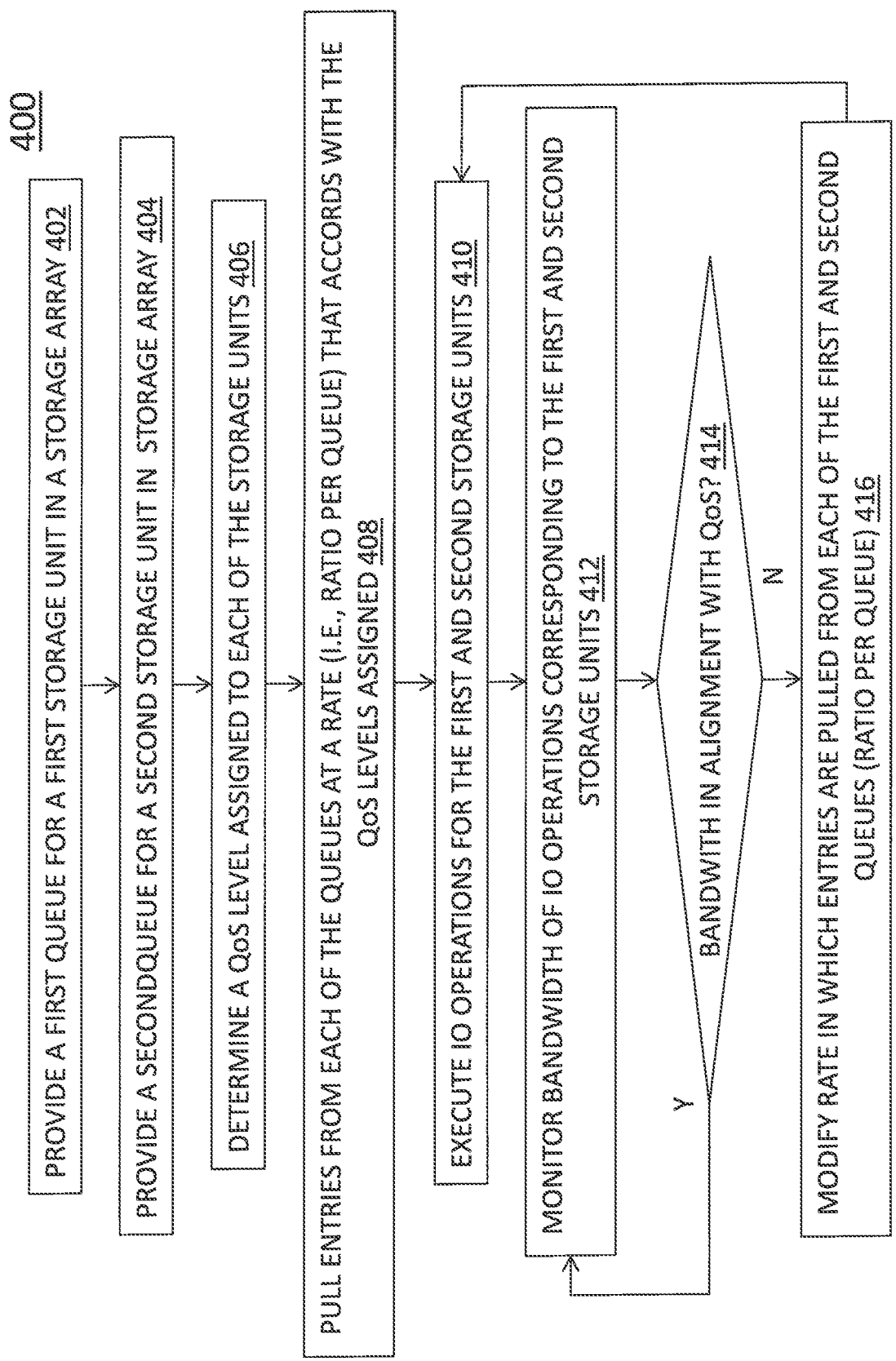
FIG. 4 is a flow diagram illustrating a process for performing dynamic balancing of IO operations for storage units in accordance with an embodiment.

Turning now to FIG. 4, a flow diagram of a process 400 for perform dynamic balancing of IO operations for the storage system will now be described in accordance with an embodiment.

In block 402, a first queue is provided for receiving IO requests from a client, and in block 404, a second queue is provided for receiving IO requests from a client. The first queue holds IO requests destined for a first storage unit, and the second queue holds IO requests destined for a second storage unit.

In block 406, a QoS level assigned to each of the storage units is determined.

In block 408, the process 400 pulls entries from each of the queues at a rate that accords with the QoS levels assigned to each of the storage units (i.e., a ratio per queue). For example, if the first queue has a QoS L1 and the second queue has a QoS L2, then entries are pulled from the first queue at twice the rate of the second queue.

In block 410, the entries pulled from the queues are executed as IO operations.

In block 412, the bandwidth usage corresponding to the executed IO operations is monitored. In block 414, it is determined whether the bandwidth usage responsive to the monitoring indicates that the QoS assigned to the storage units is in balance. For instance, the QoS assigned to the storage units is in balance when the current (monitored) bandwidth indicates that the storage unit is receiving bandwidth at the rate specified in the QoS.

If so, the process 400 returns to block 410 whereby the bandwidth usage continues to be monitored for the duration of the IO operations. However, in block 414, if the bandwidth usage is out of balance with the assigned QoS, the process 400 modifies the rate (i.e., the ratio per queue—number of IOS of the next polling cycle should come from that queue) at which the entries are pulled from the queue in block 416. Thus, the ratio is adaptively adjusted. The process returns to block 412 in a loop fashion until the desired balance is realized.

Figure 5:
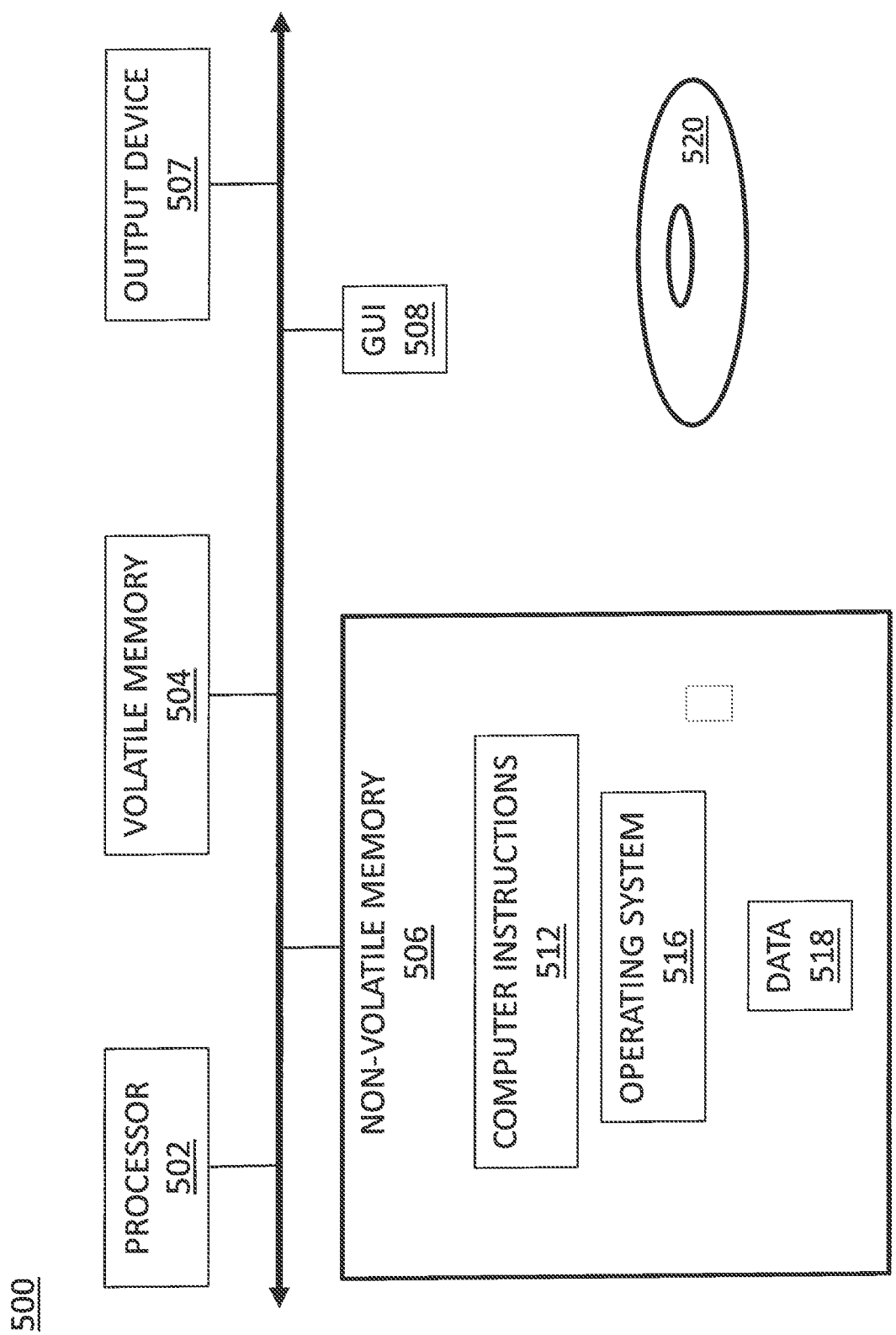
FIG. 5 is a block diagram of an illustrative computer that can perform at least a portion of the processing described herein.

FIG. 5 shows an exemplary computer 500 (e.g., physical or virtual) that can perform at least part of the processing described herein. The computer 500 includes a processor 502, a volatile memory 504, a non-volatile memory 506 (e.g., hard disk or flash), an output device 507 and a graphical user interface (GUI) 508 (e.g., a mouse, a keyboard, a display, for example). The non-volatile memory 506 stores computer instructions 512, an operating system 516 and data 518. In one example, the computer instructions 512 are executed by the processor 502 out of volatile memory 504. In one embodiment, an article 520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to the disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

We claim:

1. A method for performing dynamic balancing of input/output (IO) operations for storage units, the method comprising:
    providing a first queue for a first storage unit of the storage units;
    providing a second queue for a second storage unit of the storage units, the first queue and the second queue configured to receive input/output (IO) requests directed to corresponding first and second storage units;
    determining a quality of service (QoS) value assigned to each of the first storage unit and the second storage unit;
    pulling entries from each of the first queue and the second queue at a rate that accords with the QoS value assigned to each of the first storage unit and the second storage unit;
    executing IO operations pursuant to the pulled entries;
    monitoring bandwidth of the IO operations, responsive to the executing, with respect to the first storage unit and the second storage unit; and
    upon determining, from the monitoring, the bandwidth is not in alignment with the QoS value for either of the first storage unit and the second storage unit, adaptively adjusting a ratio in which numbers of entries are pulled from the first queue and the second queue during a subsequent polling cycle based on the monitored bandwidth of the IO operations with respect to the first storage unit and the monitored bandwidth of the IO operations with respect to the second storage unit, continuing the monitoring the bandwidth and the adaptively adjusting the ratio until the bandwidth aligns with the QoS value assigned to each of the first storage unit and the second storage unit.

2. The method of claim 1, wherein the QoS value assigned to the first queue is the same as the QoS value assigned to the second queue.

3. The method of claim 1, wherein the QoS value assigned to the first queue is different than the QoS value assigned to the second queue.

4. The method of claim 3, wherein the rate in which the entries are pulled from the first queue is initially different.

5. The method of claim 1, further comprising:
    in response to the monitoring, upon determining a predefined bandwidth level has not been reached for either of the first storage unit and the second storage unit, maintaining the rate of the pulling entries.

6. The method of claim 1, wherein the first storage unit and the second storage unit are volumes of a storage array.

7. A system for performing dynamic balancing of input/output (IO) operations for storage units, the system comprising:
    a memory comprising computer-executable instructions; and
    a processor operable by a storage system, the processor executing the computer-executable instructions, the computer-executable instructions when executed by the processor cause the processor to perform operations comprising:
        providing a first queue for a first storage unit of the storage units;
        providing a second queue for a second storage unit of the storage units, the first queue and the second queue configured to receive input/output (IO) requests directed to corresponding first and second storage units;
        determining a quality of service (QoS) value assigned to each of the first storage unit and the second storage unit;
        pulling entries from each of the first queue and the second queue at a rate that accords with the QoS value assigned to each of the first storage unit and the second storage unit;
        executing IO operations pursuant to the pulled entries;
        monitoring bandwidth of the IO operations, responsive to the executing, with respect to the first storage unit and the second storage unit; and
        upon determining, from the monitoring, the bandwidth is not in alignment with the QoS value for either of the first storage unit and the second storage unit, adaptively adjusting a ratio in which numbers of entries are pulled from the first queue and the second queue during a subsequent polling cycle based on the monitored bandwidth of the IO operations with respect to the first storage unit and the monitored bandwidth of the IO operations with respect to the second storage unit, continuing the monitoring the bandwidth and the adaptively adjusting the ratio until the bandwidth aligns with the QoS value assigned to each of the first storage unit and the second storage unit.

8. The system of claim 7, wherein the QoS value assigned to the first queue is the same as the QoS value assigned to the second queue.

9. The system of claim 7, wherein the QoS value assigned to the first queue is different than the QoS value assigned to the second queue.

10. The system of claim 9, wherein the rate in which the entries are pulled from the first queue are initially different.

11. The system of claim 7, wherein the operations further comprise:
    in response to the monitoring, upon determining a predefined bandwidth level has not been reached for either of the first storage unit and the second storage unit, maintaining the rate of the pulling entries.

12. The system of claim 7, wherein the first storage unit and the second storage unit are volumes of a storage array.

13. A computer program product for performing dynamic balancing of input/output (IO) operations for storage units, the computer program product embodied on a non-transitory computer readable medium, and the computer program product including instructions that, when executed by a computer, causes the computer to perform operations comprising:

providing a first queue for a first storage unit of the storage units;

providing a second queue for a second storage unit of the storage units, the first queue and the second queue configured to receive input/output (IO) requests directed to corresponding first and second storage units;

determining a quality of service (QoS) value assigned to each of the first storage unit and the second storage unit;

pulling entries from each of the first queue and the second queue at a rate that accords with the QoS value assigned to each of the first storage unit and the second storage unit;

executing IO operations pursuant to the pulled entries;

monitoring bandwidth of the IO operations, responsive to the executing, with respect to the first storage unit and the second storage unit; and upon determining, from the monitoring, the bandwidth is not in alignment with the QoS value for either of the first storage unit and the second storage unit, adaptively adjusting a ratio in which numbers of entries are pulled from the first queue and the second queue during a subsequent polling cycle based on the monitored bandwidth of the IO operations with respect to the first storage unit and the monitored bandwidth of the IO operations with respect to the second storage unit, continuing the monitoring the bandwidth and the adaptively adjusting the ratio until the bandwidth aligns with the QoS value assigned to each of the first storage unit and the second storage unit.

14. The computer program product of claim 13, wherein the QoS value assigned to the first queue is the same as the QoS value assigned to the second queue.

15. The computer program product of claim 13, wherein the QoS value assigned to the first queue is different than the QoS value assigned to the second queue.

16. The computer program product of claim 15, wherein the rate in which the entries are pulled from the first queue are initially different.

17. The computer program product of claim 13, wherein the operations further comprise:

in response to the monitoring, upon determining a predefined bandwidth level has not been reached for either of the first storage unit and the second storage unit, maintaining the rate of the pulling the entries.

* * * * *